United States Patent
Park et al.

(10) Patent No.: US 9,182,911 B2
(45) Date of Patent: Nov. 10, 2015

(54) MENU DISPLAY METHOD OF MOBILE TERMINAL

(75) Inventors: Jun-Serk Park, Seoul (KR); Mee-Yeon Choi, Seoul (KR); Dong-Seok Lee, Seoul (KR); Byoung-Nam Lee, Seoul (KR); Jin-Woo Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 972 days.

(21) Appl. No.: 12/392,766

(22) Filed: Feb. 25, 2009

(65) Prior Publication Data

US 2010/0022276 A1 Jan. 28, 2010

(30) Foreign Application Priority Data

Jul. 22, 2008 (KR) .................. 10-2008-0071214

(51) Int. Cl.
*H04B 1/38* (2015.01)
*G06F 3/0489* (2013.01)
*G06F 3/0482* (2013.01)

(52) U.S. Cl.
CPC .......... *G06F 3/04892* (2013.01); *G06F 3/0482* (2013.01); *G06F 2203/04803* (2013.01)

(58) Field of Classification Search
CPC .............. G06F 2203/04803; G06F 3/04892; G06F 3/0482

USPC ......... 715/762–763, 810, 828–829, 830, 835, 715/863–865, 784–787, 767, 759; 455/566; 345/671, 681–688

See application file for complete search history.

(56) References Cited

U.S. PATENT DOCUMENTS

| | | | |
|---|---|---|---|
| 5,615,384 A * | 3/1997 | Allard et al. ................ | 715/800 |
| 5,771,042 A * | 6/1998 | Santos-Gomez ............. | 715/800 |
| 6,832,355 B1 * | 12/2004 | Duperrouzel et al. ........ | 715/788 |
| 2006/0190833 A1 * | 8/2006 | SanGiovanni et al. ....... | 715/767 |
| 2007/0247440 A1 * | 10/2007 | Shin et al. .................... | 345/173 |
| 2008/0052945 A1 * | 3/2008 | Matas et al. .................. | 34/173 |
| 2008/0125180 A1 * | 5/2008 | Hoffman et al. .............. | 455/566 |
| 2008/0158189 A1 * | 7/2008 | Kim ............................... | 455/566 |
| 2009/0293007 A1 * | 11/2009 | Duarte et al. ................. | 715/767 |

* cited by examiner

*Primary Examiner* — Rafael Pérez-Gutiérrez
*Assistant Examiner* — Thai Vu
(74) *Attorney, Agent, or Firm* — Birch, Stewart, Kolasch & Birch, LLP

(57) ABSTRACT

A mobile terminal including a display having a menu display portion configured to display a menu group among a plurality of menu groups that are arranged in a same planar surface, a handler mechanism configured to traverse through the plurality of menu groups, and a controller configured to select one menu group among the plurality of menu groups to be displayed in the menu display portion based on a manipulation of the handler mechanism.

11 Claims, 18 Drawing Sheets

FIG. 9A
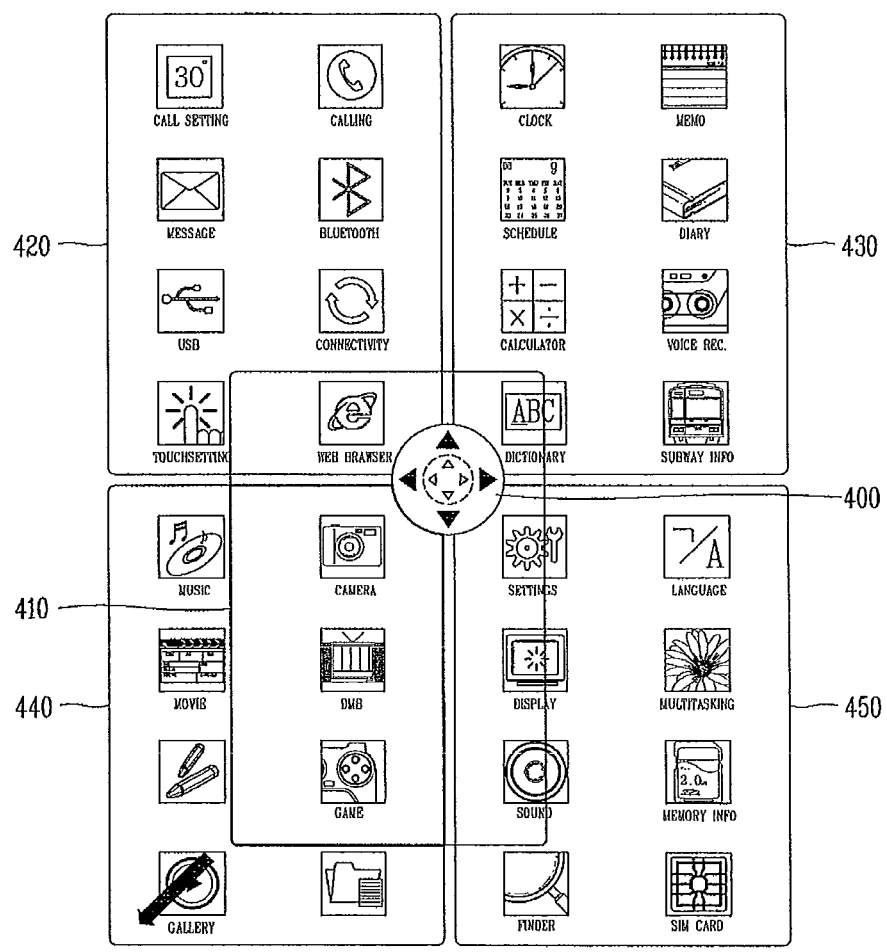
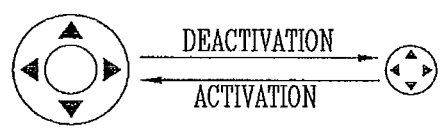

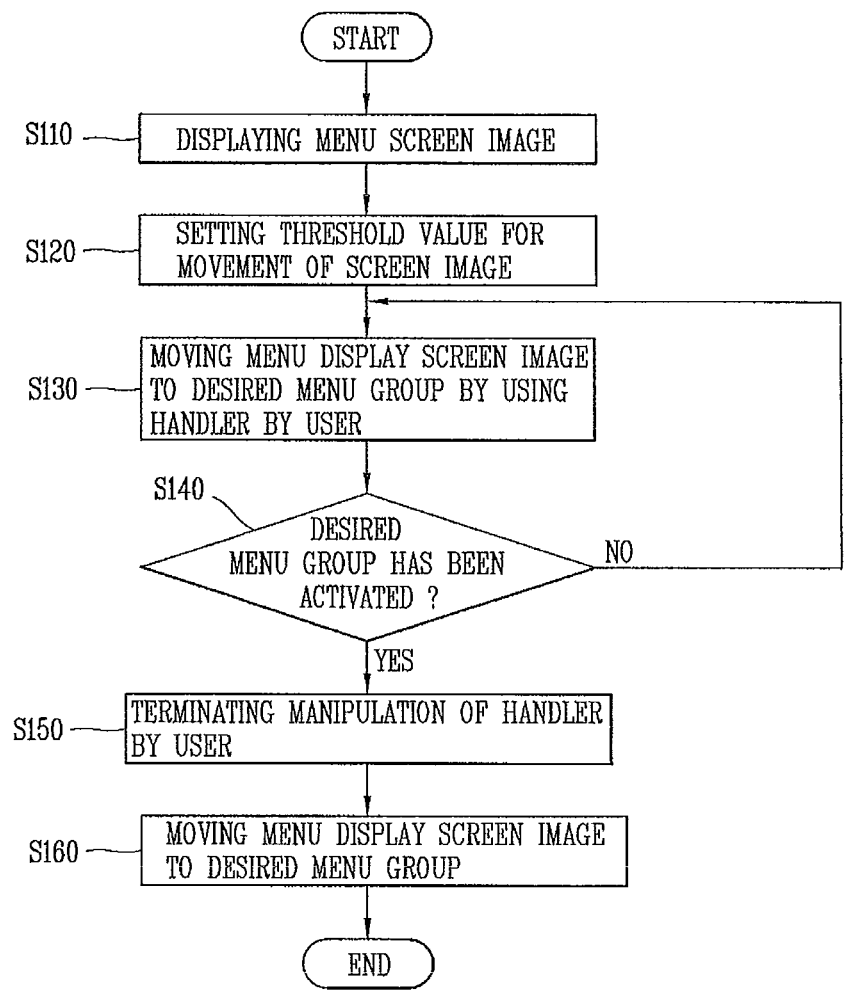

MENU DISPLAY METHOD OF MOBILE TERMINAL

CROSS REFERENCE TO RELATED APPLICATIONS

The present application claims priority to Korean Application No. 10-2008-0071214 filed in Korea on Jul. 22, 2008, the entire contents of which is hereby incorporated by reference in its entirety.

BACKGROUND OF THE INVENTION

1. Field of the Invention

The present invention relates to a mobile terminal and corresponding method of displaying menus on the mobile terminal.

2. Description of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

Because mobile terminals now provide a variety of functions, the user interface includes a complicated menu structure that the user has to search through to access any one or more of the functions. The mobile terminals also have small display screens so it is difficult to provide various functions that can be easily accessed by the user. The complicated menu structure inconveniences the user.

SUMMARY OF THE INVENTION

Accordingly, one object of the present invention is to address the above-noted and other problems.

Another object of the present invention is to provide a mobile terminal having a menu configuration of a planar structure.

Still another object of the present invention is to provide a mobile terminal having a handler and corresponding method for moving and changing menus at a particular region of a menu screen.

To achieve these and other advantages and in accordance with the purpose of the present invention, as embodied and broadly described herein, the present invention provides in one aspect a mobile terminal including a display to display menus in groups on a same planar surface and display a handler used for selecting the menu groups, and a controller configured to manipulate the handler according to an external input so as to selectively display the menu groups.

To achieve these and other advantages and in accordance with the purpose of the present invention, as embodied and broadly described herein, the present invention provides in another aspect a method for displaying a menu of a mobile terminal and which includes displaying menus by groups on a same planar surface and displaying a handler used for selecting the menu groups, moving the handler according to an external input, and selecting and displaying a menu group according to the movement of the handler.

In yet another aspect, the present invention provides a mobile terminal including a display having a menu display portion configured to display a menu group among a plurality of menu groups that are arranged in a same planar surface, a handler mechanism configured to traverse through the plurality of menu groups, and a controller configured to select one menu group among the plurality of menu groups to be displayed in the menu display portion based on a manipulation of the handler mechanism.

In still another aspect, the present invention provides a method of controlling a mobile terminal, and which includes displaying a menu group among a plurality of menu groups that are arranged in a same planar surface in a menu display portion of the terminal, receiving a traversing input signal corresponding to a traversing action be performed through the plurality of menu groups, and selecting one menu group among the plurality of menu groups to be displayed in the menu display portion based on the received handler input signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 9A and 9B are overviews of display screens illustrating a screen movement according to the first embodiment of the present invention;

FIG. 11 is a flow chart illustrating a menu display method according to a second embodiment of the present invention;

DETAILED DESCRIPTION OF THE INVENTION

Reference will now be made in detail to the preferred embodiments of the present invention, examples of which are illustrated in the accompanying drawings.

Figure 1:
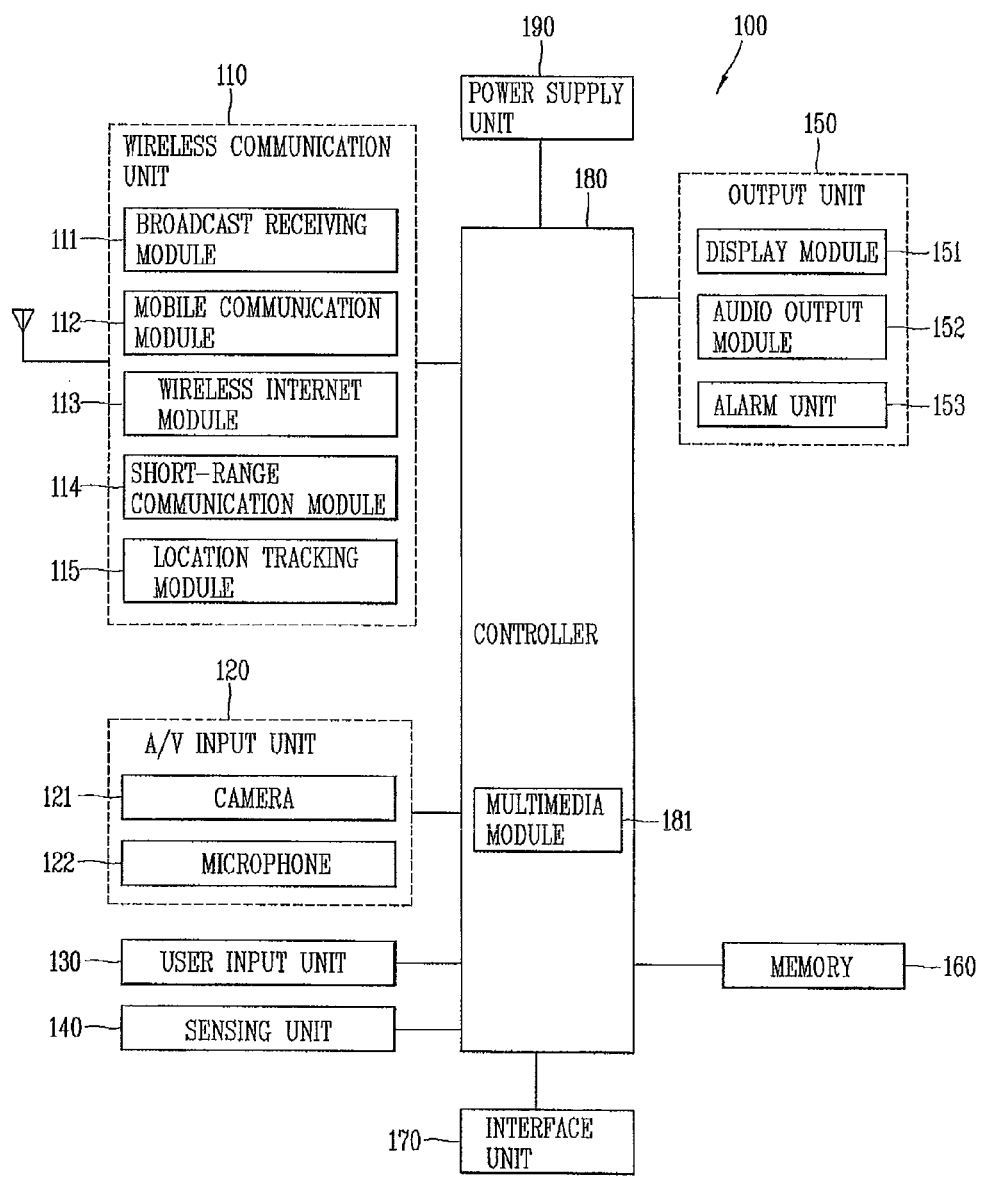
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of the digital multimedia broadcasting (DMB) system and electronic service guide (ESG) of the digital video broadcast-handheld (DVB-H) system.

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DNB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, generally includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display module 151 (hereinafter referred to as the display 151) that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that generally controls the overall operations of the mobile terminal 100. For instance, the controller 180 performs the control and processing associated with voice calls, data communications, instant message communications, video calls, camera operations and recording operations. As shown in FIG. 1, the controller 180 also includes a multimedia module 181 for providing multimedia playback functions. The multimedia module 181 may be configured as part of the controller 180, or may be implemented as a separate component. In addition, a power supply 190 provides power used by the various components for the portable device. The provided power may be internal power, external power, or combinations thereof.

Figure 2:
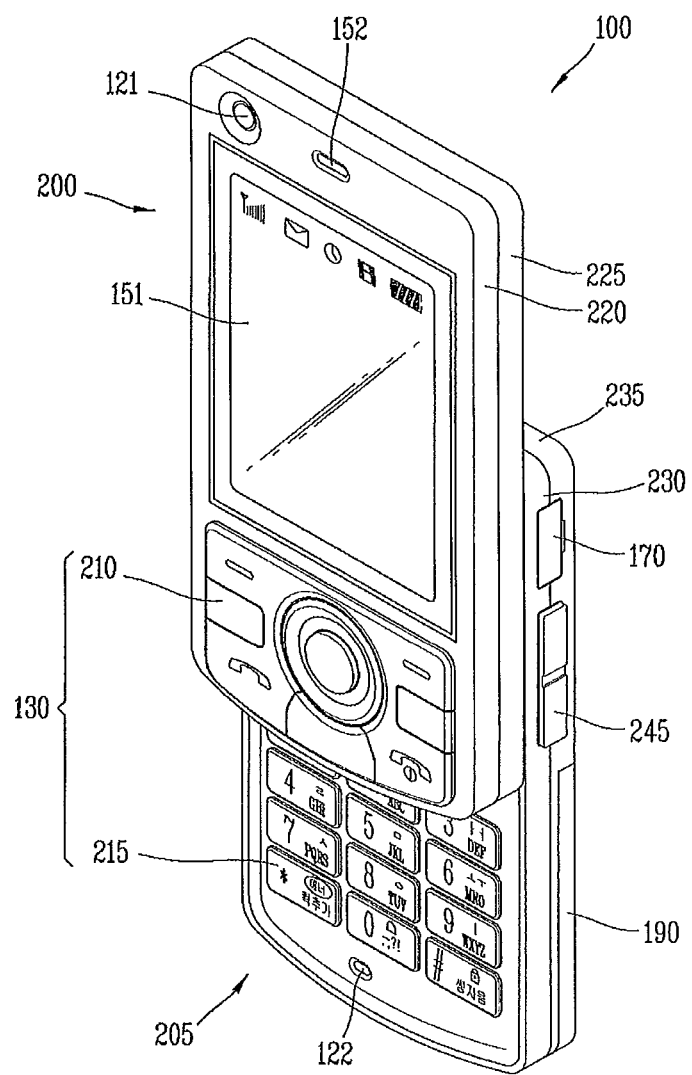
FIG. 2 is a front perspective view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are generally sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
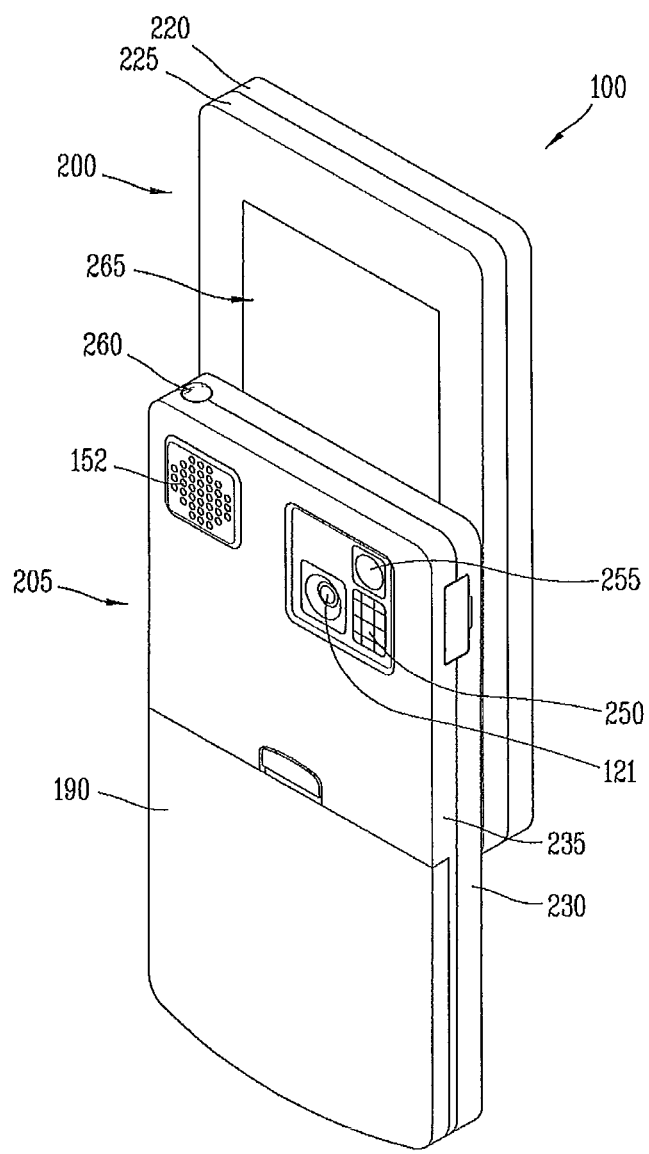
FIG. 3 is a rear perspective view of a mobile terminal according to an embodiment of the present invention.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). The antenna 260 may also be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. For example, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
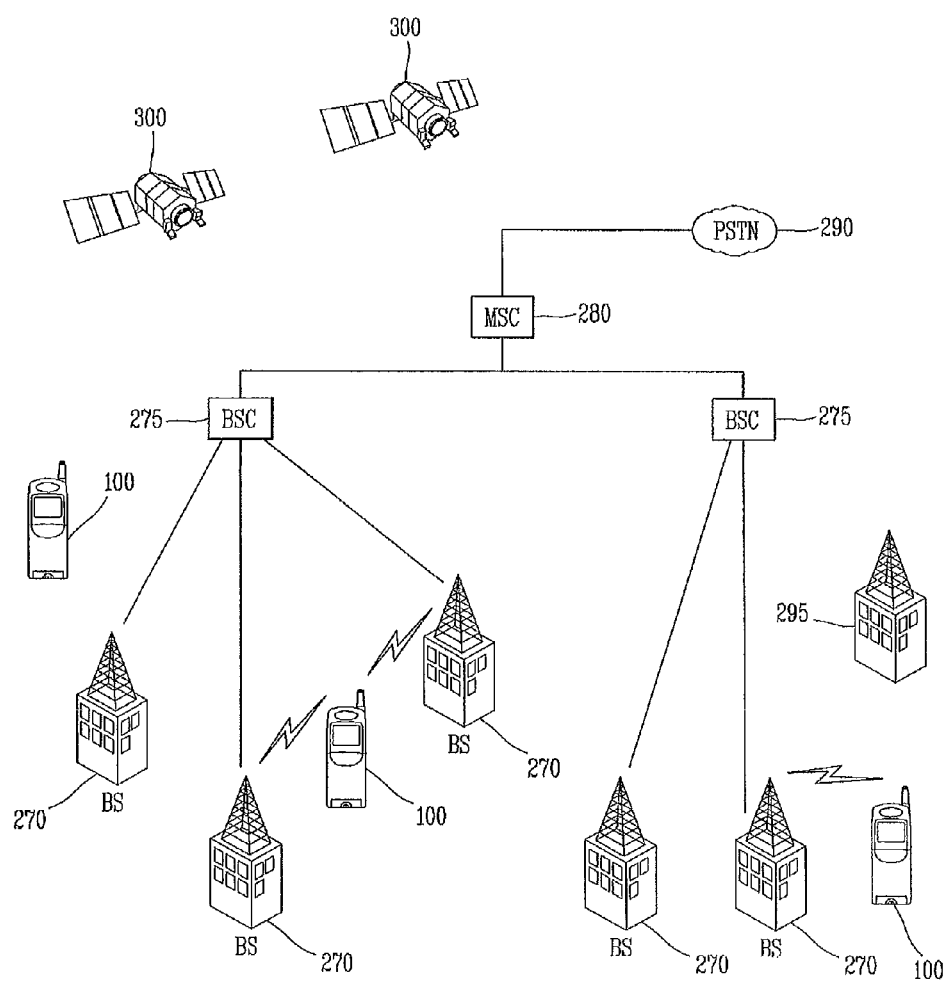
FIG. 4 is a block diagram of a wireless communication system with which the mobile terminal according to an embodiment of the present invention is operable.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during operation of the wireless communication system, the base stations 270 receive sets of reverse-link signals from various mobile terminals 100. The mobile terminals 100 also engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a mobile terminal and corresponding method are explained with respect to various embodiments. However, the following embodiments can be implemented independently or through combinations thereof. In addition, in the following description, it is assumed that the display module 151 includes a touch screen.

An embodiment of the present invention is directed to a mobile terminal for arranging menus in a planar structure so as to facilitate movement between menus and the selection of a desired menu. In addition, an embodiment of the present invention is directed to a menu display method for facilitating movement and changing between menus by displaying a handler the user can manipulate to traverse through and select desired menus.

Figure 5A:
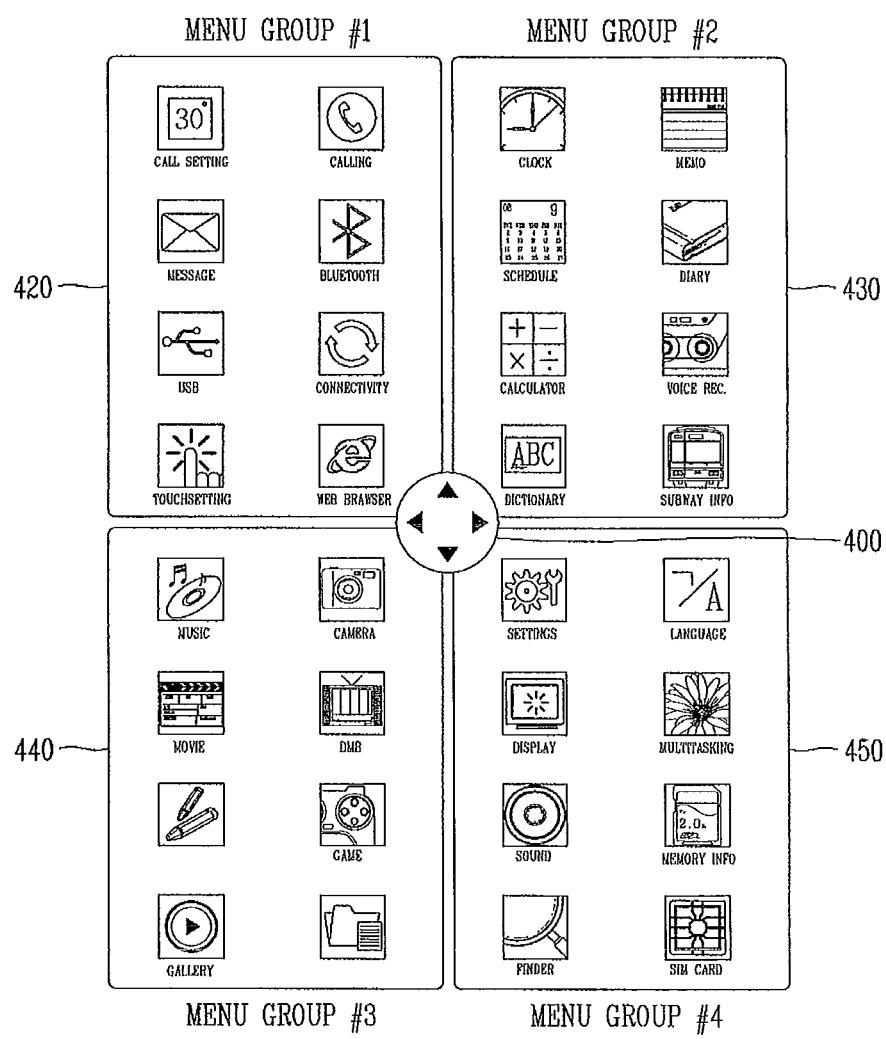
FIGS. 5A to 5C are overviews of display screens illustrating different menu screens according to the present invention.
Figure 5B:
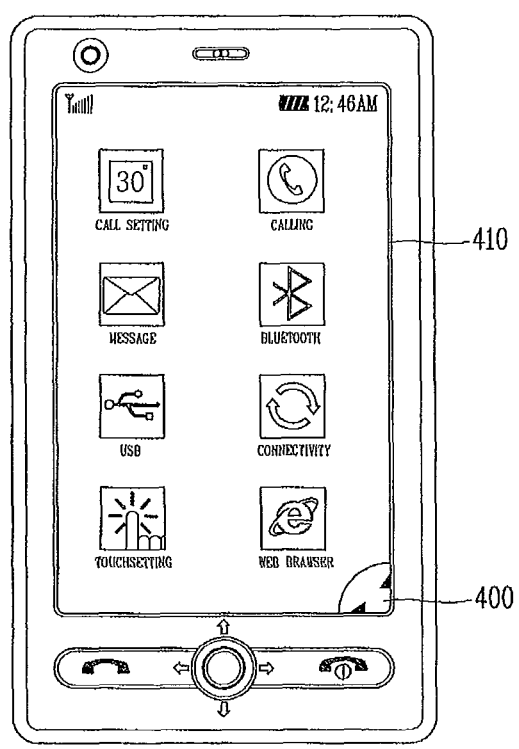
Figure 5C:
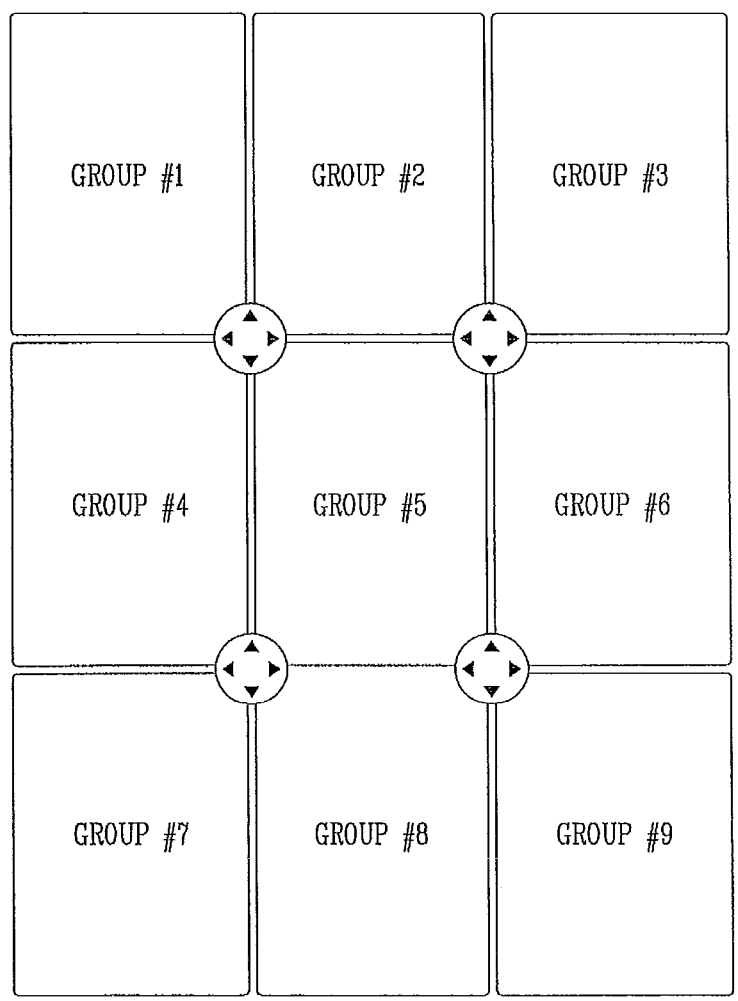

In more detail, FIGS. 5A to 5C are overviews of display screens illustrating different menu screens according to an embodiment of the present invention. In the embodiment shown in FIG. 5A, the menu structure includes four groups of menus 420, 430, 440 and 450 with a handler 400 disposed in a center of the menu structure. FIG. 5C illustrates the menu structure including nine groups of menus. The number of groups in the menu structure can be preset by a manufacturer of the terminal and/or can be set by a user using the appropriate menu options provided on the mobile terminal according to the present invention. In addition, as shown in FIGS. 5A and 5C, the menu groups are arranged in a single plane (e.g., the menu groups are arranged in a parallel plane with each other).

FIG. 5B illustrates a menu screen image 410 that the user can view. That is, the menu screen image 410 is the area of the display that the user sees. Thus, if the user selects the first group of menus in FIG. 5A, the menu screen image 410 would include the menus shown in the first group 420. Similarly, if the user selects the second group of menus 430, the menu screen image 410 would display the menus in the second group of menus 430. A similar concept applies to the third and fourth group of menus 440 and 450 shown in FIG. 5A.

The user can also traverse through the different menu groups using a touch and drag or flicking operation or by using the handler 400. In more detail, if the handler 400 is deactivated, the user can use a touch operation to traverse through the menu groups. When the handler 400 is activated, the user can use the handler 400 to traverse through the menu groups. The user can also activate and deactivate (toggle) the handler 400 using a touch operation or using an physical key on the terminal, for example. The user can also use a voice activation command to toggle between the different states of the handler 400.

A more detailed description of an embodiment of the present invention will now be given with respect to the flow chart shown in FIG. 6 and the display screens shown in FIGS. 5 and 7-10. FIG. 1 will also be referred to throughout the following description of the present invention.

Figure 6:
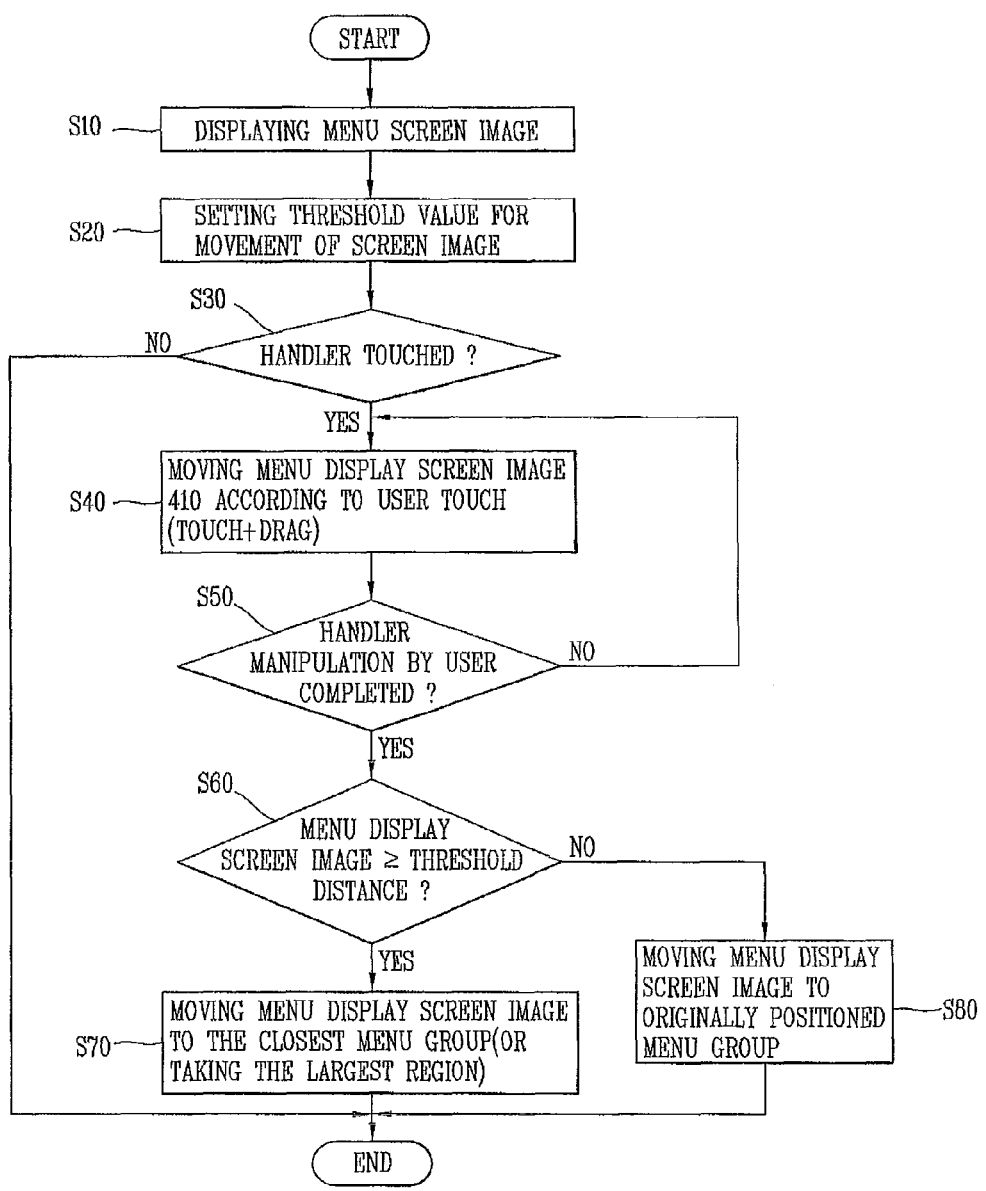
FIG. 6 is a flow chart illustrating a menu display method according to a first embodiment of the present invention.
Figure 7:
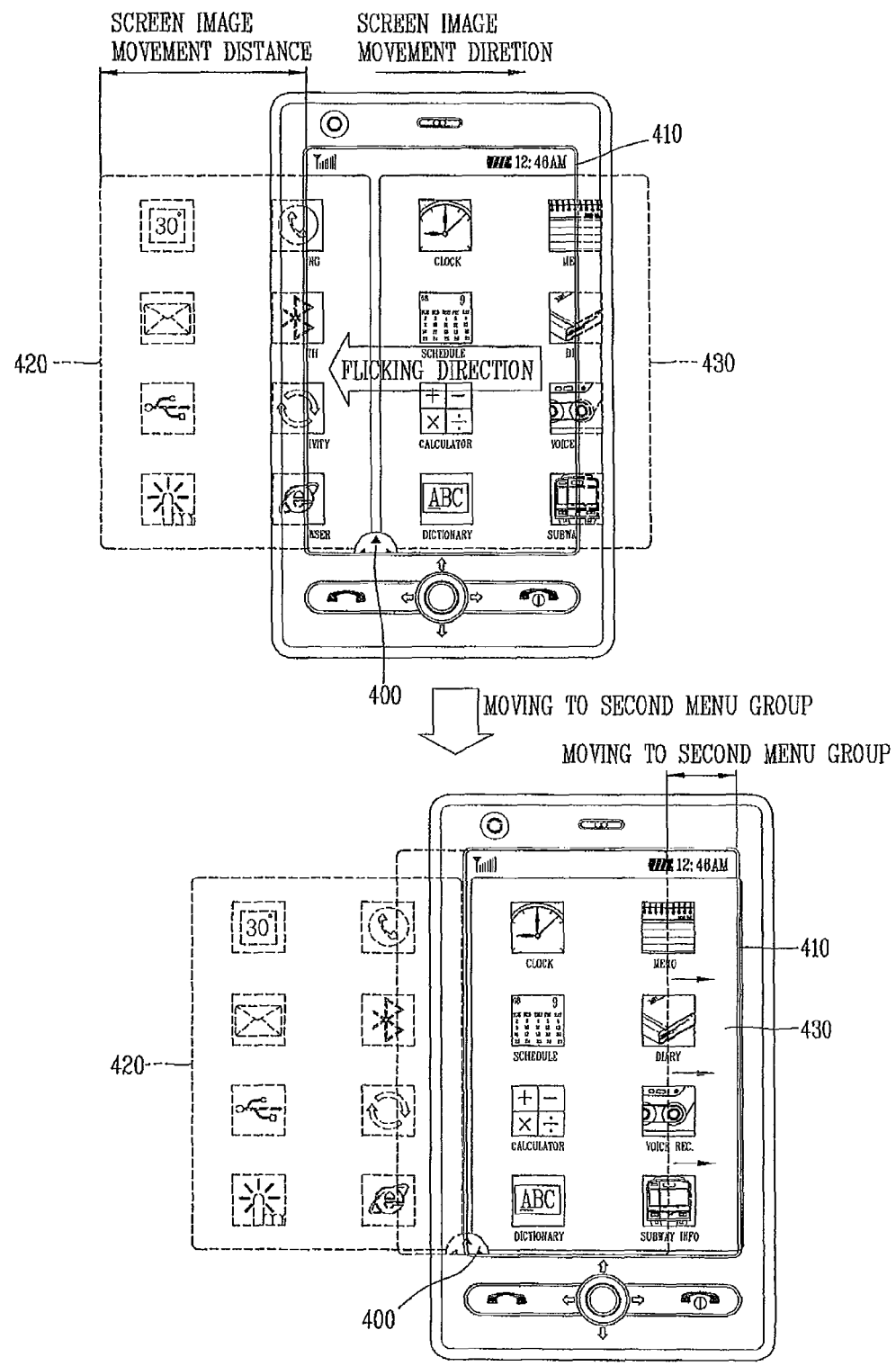
FIGS. 7 and 8 are overviews of display screens illustrating the menu display method according to the first embodiment of the present invention.

As shown in FIG. 6, when the menu screen image as shown in FIG. 5A or 5C is executed (S10), the controller 180 sets or reads a threshold value (referred to as 'threshold distance' hereinafter) with respect to a screen image movement (S20). The threshold distance corresponds to an amount of distance a menu is moved. For example, FIG. 7 illustrates the concept relating to the screen image distance movement. Thus, the screen image distance movement corresponds to an amount of the touch and drag or flicking operation the user performs.

For example, if the user only flicks a menu group in a right to left direction, the controller 180 can determine whether this flicking operation exceeds a particular threshold. If the controller 180 determines the flicking operation exceeds the particular threshold, the controller 180 moves the image groups on the display module 151.

In addition, as shown in FIG. 6, the controller 180 determines whether or not the handler 400 is activated (S30). As discussed above, the user can activate the handler 400 using a touching operation, using a physical key on the terminal, using voice activation techniques, etc. If the controller 180 determines the user has activated the handler (Yes in S30), the user can move the menu groups using the handler. The controller 180 also releases the set threshold distance. Further, the releasing of the set threshold distance is maintained until the handler 400 is deactivated.

FIG. 9A illustrates one embodiment of using the handler 400 to traverse through the different menu groups. In this embodiment, the user can touch and drag the handler 400 to move the menu display screen image 410 to a desired menu group (e.g., the third menu group 440). Thus, using the handler 400, the user can traverse through and select any one of the menu groups.

In addition, as shown in FIG. 9A, the user has moved the menu display screen image 410 over a portion of the third menu group 440 (actually the menu groups are moved below the screen image 410, because the screen image 410 corresponds to the area of the display module 150 viewed by the user). Thus, manipulating the handler 400 results in the traversal through the plurality of menu groups. In addition, in FIG. 9A, the user does not have to move the screen image 410 completely over the desired menu group (the third menu group 440 in this example), because the controller 180 determines if the menu display screen image 410 is positioned within a threshold distance region of the third menu group 440.

If the controller 180 determines the user has positioned the menu display screen image 410 within the threshold distance region, as shown in FIG. 9A, the controller 180 automatically displays the third menu group 440 within the display screen image 410. Further, the controller 180 can "snap" the third menu group 440 to be displayed within the display screen image 410 using an accelerated movement. That is, the accelerated movement gives the user the feeling of the third menu group being snapped into place on the display screen image 410. The controller 180 can perform the accelerated movement as soon as the screen image 410 is over the particular group of menus by the predetermined threshold or as soon as the user releases the touch operation on the handler 400.

Figure 10A:
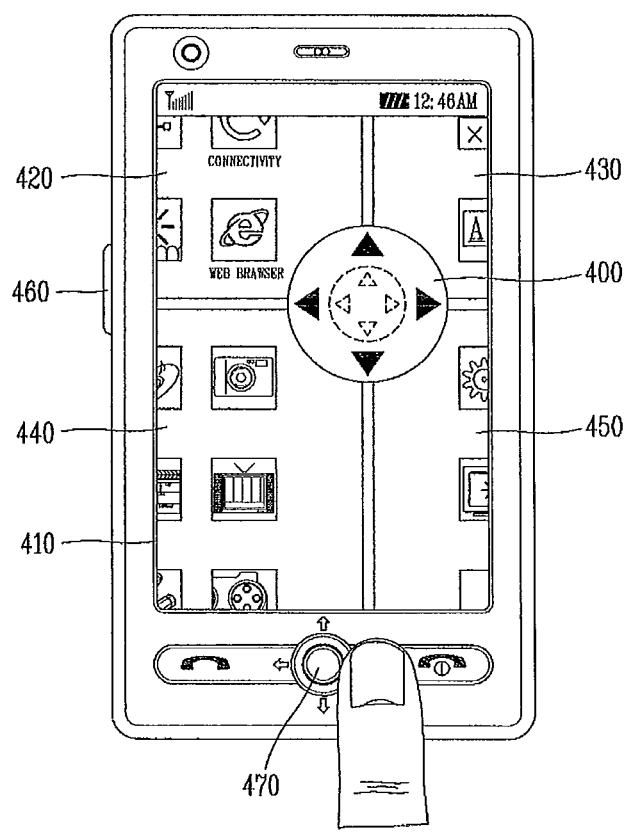
FIGS. 10A and 10B are overviews of display screens illustrating a screen movement of FIGS. 9A and 9B in view of a user.

FIG. 10A illustrates another example of the user using the handler 400 to traverse through the different menu groups. In this example, the user uses a direction key 470. Further, the controller 180 also displays the handler 400 on the display screen image 410 such that the user can see how his manipulation of the direction key 470 corresponds to manipulation of the handler 400. The direction key 470 can be a jog dial key, arrow keys, etc. FIG. 10A also illustrates the user moving between the menu groups 420, 430, 440 and 450.

Figure 9B:
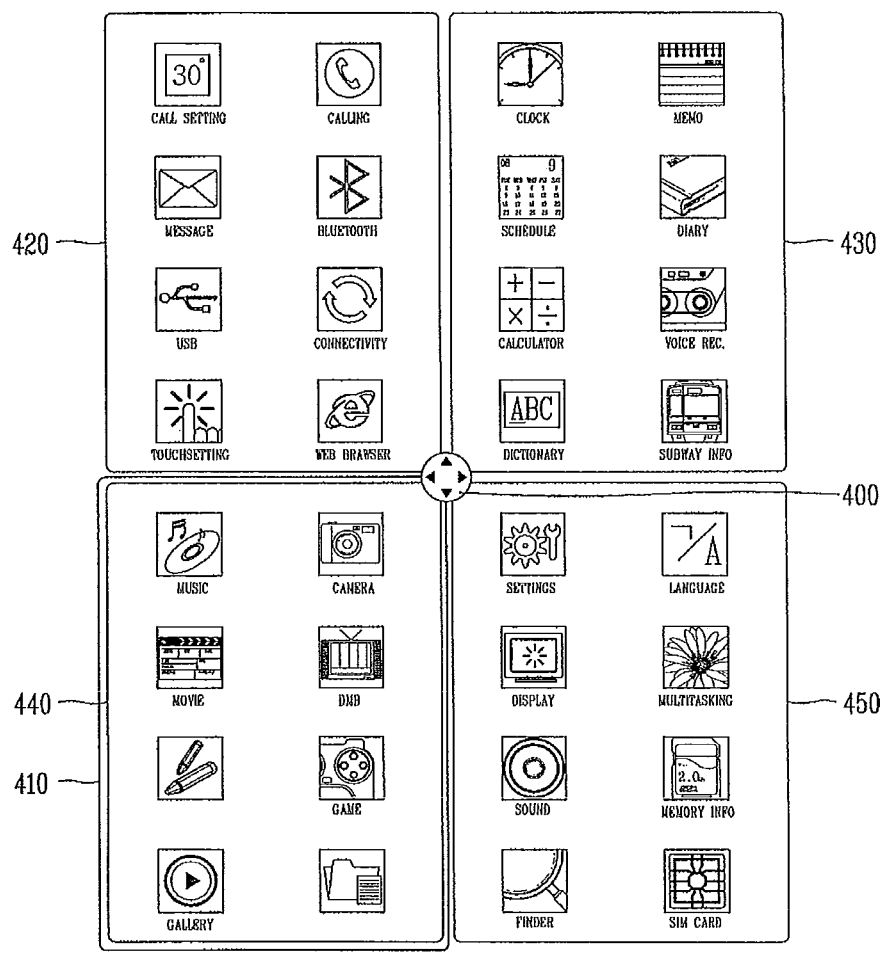

In addition, the controller 180 can also distinctively display the handler 400 to let the user know whether the handler is activated or deactivated. For example, the controller 180 can increase the size of the handler 400 to indicate to the user that the handler 400 is activate (FIGS. 9A and 10A illustrates this feature). Thus, the user can clearly see the handler 400 is activated. The controller 180 can also output vibrations or other haptic affects to illustrate whether the handler 400 is activated or deactivated. FIG. 9B illustrates the handler 400 being deactivated.

Returning back to FIG. 6, the controller 180 determines if the user has completed the manipulation of the handler 400 (S50). For example, the user can stop touching the handler 400. It is also possible that the controller 180 determines the user has completed using the handler 400 when a particular menu group has been displayed or selected, and no other input has happened with regard to the handler 400 for a predetermined time period.

Figure 8:
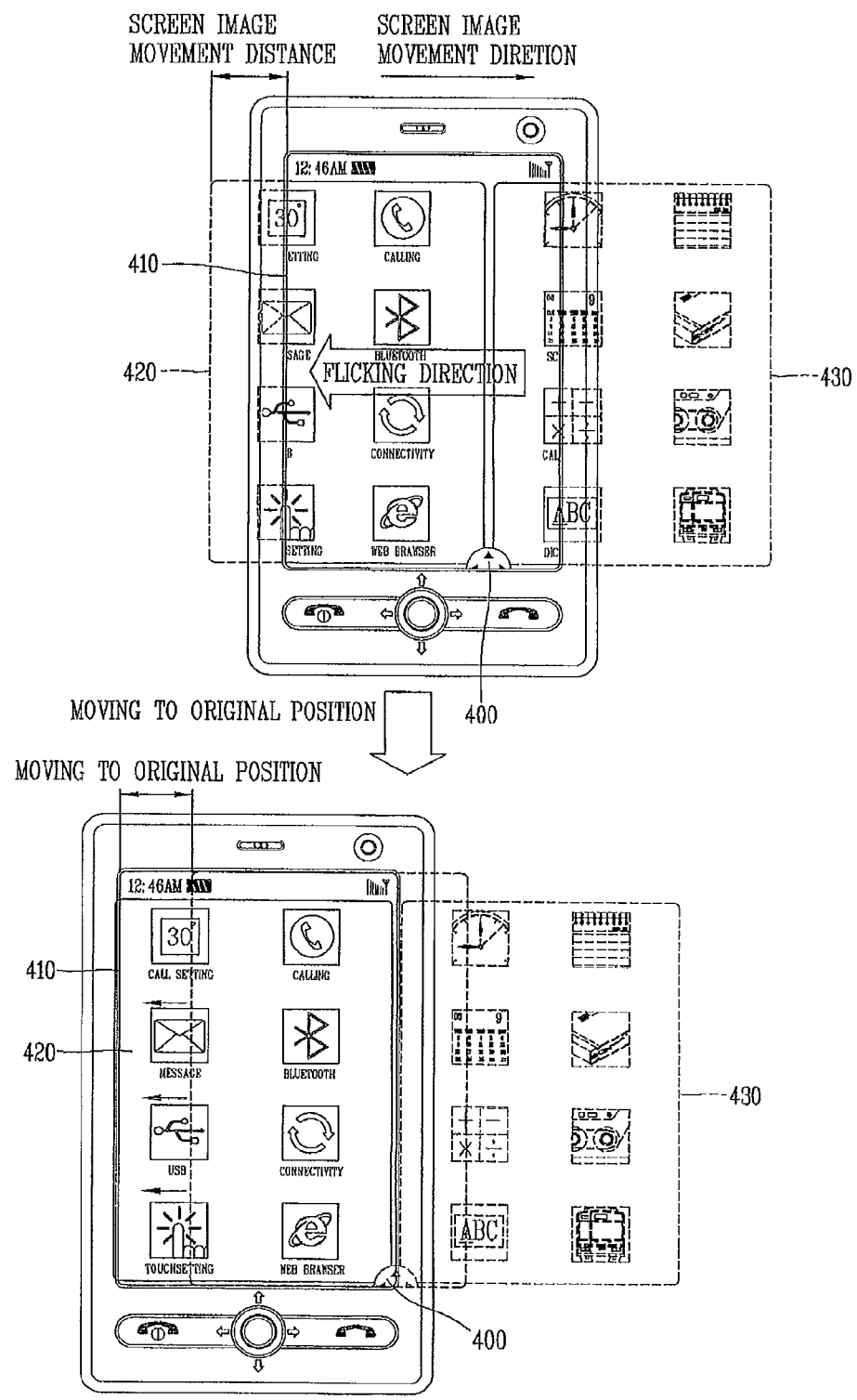

If the controller 180 determines the user has stop manipulated the handler 400 (Yes in S50), the controller 180 then monitors to see if the user performs a flicking or touch and drag operation on the touch screen of the display module 151 and whether this action results in the screen image distance (see FIG. 7A, for example) has been met or exceeded (S60). If the controller 180 determines the menu display screen image 410 has been moved more than the predetermined threshold distance (Yes in S60), the controller 180 moves the screen image 410 to the closest menu group, as described above. If the controller 180 determines the menu display screen image 410 has not been moved more than the predetermined threshold distance (No in S60), the controller 180 moves the screen image 410 to the originally positioned group. FIG. 8 illustrates the menu display screen image 410 not being moved more than the predetermined threshold, and the controller 180 moving the screen image 410 to the originally positioned group.

Further, in the example shown in FIG. 7, the user has performed a flicking operation on the touch screen of the display module 151, which results in the menu display screen image 410 being moved a distance that meets or exceeds the predetermined threshold and thus the controller 180 displays the second menu group 430 within the display screen image 410. Therefore, the user sees all the menus that are included in the second menu group 430. The user can return to the first menu group 420 be performing a reverse flicking operation. In addition, the user can view the menu groups 440 and 450 by performing a downward flicking operation from the menu groups and 430, respectively. Similarly, the user can perform a diagonal flicking operation to traverse through menu groups and 450 and 430 and 440.

In an alternative embodiment, the user can perform a rotational flicking operation to spin the menu groups much like a wheel spins. That is, the user can rotate the menu groups in a circular fashion by flicking the menu groups in a circular manner. The same concept applies to the user using a jog dial key, for example.

In addition, as discussed above, the controller 180 can apply an acceleration mechanism to the movement of the menu groups when the menu display screen image 410 is returned to its original position and/or when a new menu group is displayed within the screen image 410. That is, the acceleration mechanism is an animation mechanism that uses an acceleration and deceleration to allow the movement of a selected object on a UI to have the sensation of a real action.

In addition, as described above, the user does not need to precisely move the menu display screen image 410 to the desired menu group (e.g., the third menu group 440). Rather, as shown in FIG. 9A, if the handler 400 is deactivated when the menu display screen image 410 has been moved near the third menu group 440 (e.g., within the threshold distance region of the third menu group 440), the controller 180 automatically moves the menu display screen image 410 to the third menu group 440 at the acceleration movement.

Figure 10B:
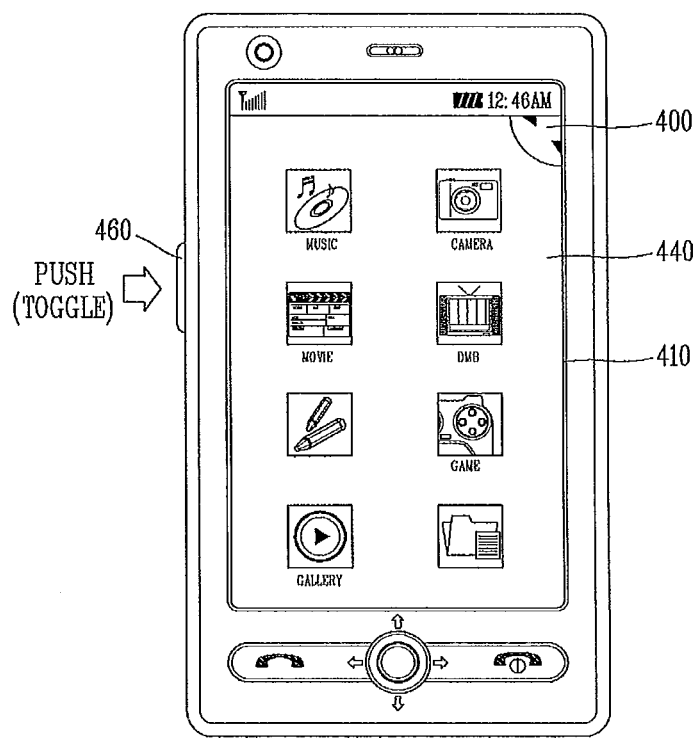

In addition, as discussed above, FIG. 10A illustrates the user using the direction key 470 to traverse through the different menu groups. In an alternative embodiment as shown in FIG. 10B, the user can also manipulate a push button 460 to toggle between the different menu groups. That is, each time the user presses the push button 460, the controller 180 moves the display screen image 410 to be over a corresponding one of the menu groups. FIG. 10B illustrates the menu group 440 being displayed based on the user manipulating the push button two times. That is, the first time corresponds to the second menu group 430 being displayed, and the second time corresponds to the third menu group 440 being displayed when assuming that the first menu group 420 was initially displayed. The user can also use voice activation commands to command the controller 180 to traverse through the different menu groups.

Next, FIG. 11 is a flow chart illustrating a menu display method according to a second embodiment of the present invention. Steps S110 and S120 are similar to the steps S10 and S20 shown in FIG. 6. Thus, a detailed description of steps S110 and S120 will be omitted. Then, as shown in FIG. 11, the user touches and drags the handler 400 to move the menu display screen image 410 to the desired menu group (e.g., the third menu group 440) (S130). The controller 180 then continuously checks the movement of the menu display screen image 410 to see if a particular menu group has been activated (S140).

Figure 12A:
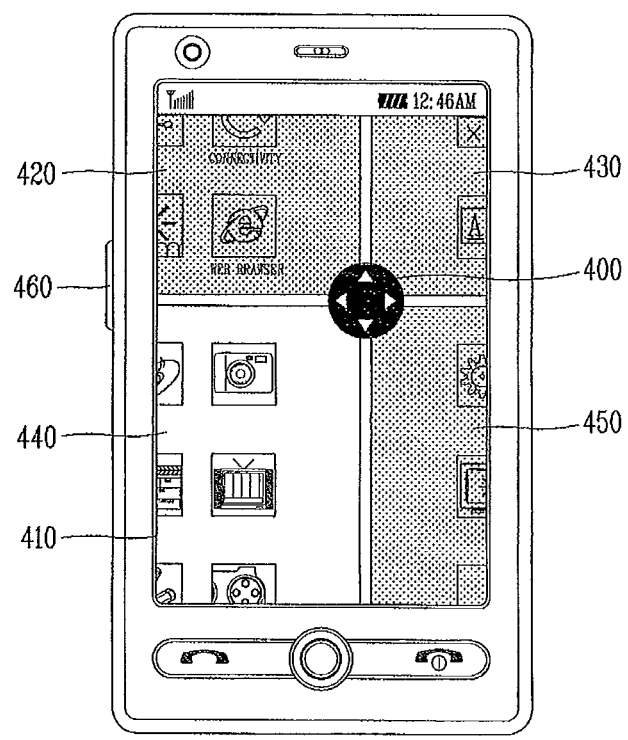
FIGS. 12A and 12B are overviews of display screens illustrating a screen movement according to the second embodiment of the present invention.

For example, FIG. 12A shows that the menu display screen image 410 is positioned in the threshold distance region of the third menu group 440. Thus, in this embodiment and as shown in FIG. 12A, the controller 180 detects this position of this position of the screen image 410 and deactivates the other remaining menu groups. That is, the controller 180 distinctively displays the activated group from the other deactivated menu groups using a shaded effect, a darkened effect, an outline effect, etc. to discriminate the activated menu group from the other remaining menu groups. FIG. 12A illustrates the controller 180 using a shading effect to distinctively display the activated menu group 440 from the deactivated menu groups 420, 430 and 450. Therefore, the user can intuitively see the activation and deactivation of particular groups based on whether the screen image 410 is moved within the particular threshold distance region.

Next, as shown in FIG. 11, the user can see that a particular desired menu group has been activated (Yes in S140), and the user can release the manipulation of the handler 400 (S150). In this instance, the controller 180 again sets the appropriate threshold distance such that the user can perform a flicking or touching and dragging operation to change between menu groups. The controller 180 also moves the screen image 410 within the display screen image 410 using the acceleration movement such that the user can see all menus in the menu group (S160).

Figure 12B:
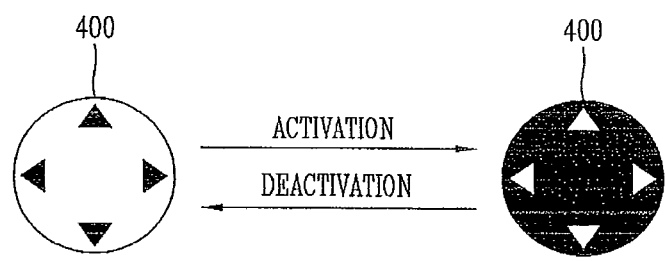

In addition, as discussed above, the controller 180 can also distinctively display the handler 400 so that the user can see when the handler 400 is activated or deactivated. FIGS. 12A and 12B illustrates the controller 180 darkening the handler 40 to indicate an activated state and lightening the handler 400 to indicate a deactivated state. The user can also set the different effects for indicating whether the handler 400 is activated or deactivated using the appropriate menu options on the mobile terminal according to the present invention.

Figure 13A:
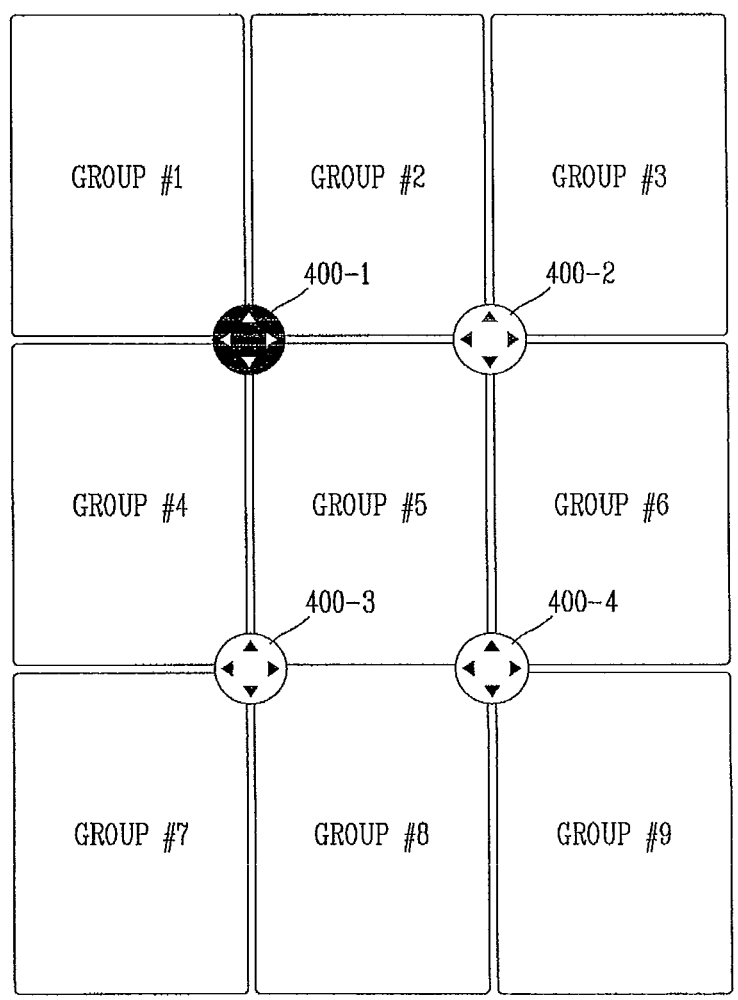
FIGS. 13A and 13B are overviews of display screens with a plurality of handlers on a menu screen.

Next, FIG. 13A illustrates a plurality of handlers being displayed for a particular menu structure. In more detail, the menu structure in this embodiment includes handlers 400-1, 400-2, 400-3 and 400-4 at intersections of each group of four menu groups. In addition, the controller 180 also advantageously distinctively displays which particular handler is activated. In the example shown in FIG. 13A, the handler is displayed as being activated. Thus, the user can easily see that the handler 400-1 is activated and the other handlers are deactivated.

Further, the user can also toggle between the different handlers using the toggle button 460 (FIG. 12A). That is, when there are several handlers on the menu screen, the user can select a desired handler by repeatedly inputting the button 460. For example, if the handler 400-1 is currently activated, and the user presses the button 460 once, the controller 180 activates the handler 400-2. Further, each time the user presses the button 460, the controller 180 can toggle between each handler.

Alternatively, if the user presses the button 460 twice in a sequential quick manner, the controller 180 can jump to and activate the handler 400-3. Similarly, if the user presses the button 460 three times in a sequential quick manner, the controller 180—activates the handler 400-4. In still another embodiment, the user can also touch each particular handler they want to activate.

Figure 13B:
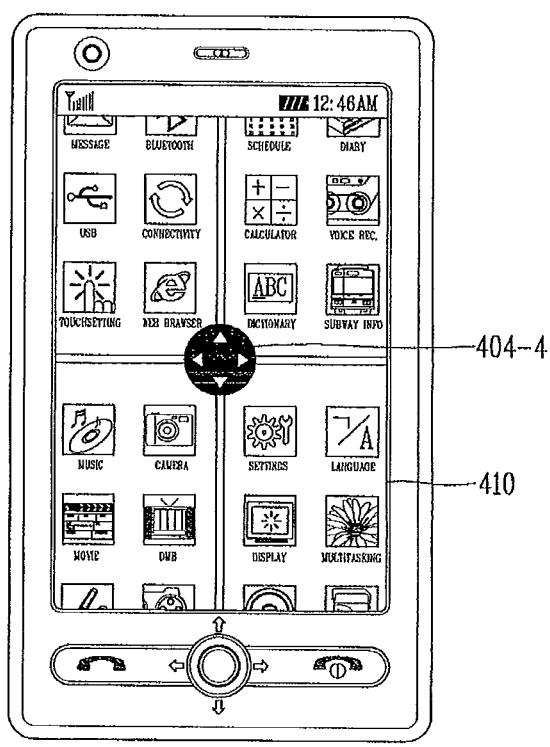

In addition, if the user continuously inputs the button 460 three times to change the activated handler 400-1 to the handler 400-4, the controller 180 displays the handler 400-4 at the center of the terminal screen image (i.e., the menu display screen image 410) while activating the handler 400-4 as shown in FIG. 13B. In this manner, the user can quickly move the menu display screen image 410 from a first menu group to a ninth menu group.

In addition, FIG. 5B illustrates a group of menus being displayed in the entire portion of the display. However, it is also possible that the display module 151 includes a display portion that displays the selected group of menus that is smaller than the entire area of the display. Thus, the user can perform a chatting session, for example, in one portion of the display while viewing all menus related to the chatting operation (or any other operation) in another portion of the display. That is, the display includes a menu display portion configured to display one menu group among a plurality of menu groups in which the display portion can be the entire display area or a smaller area.

The mobile terminal described in the embodiments of the present invention may include mobile phones, smart phones, notebook computers, digital broadcast receivers, PDAs (Personal Digital Assistants), PMPs (Portable Multimedia Player), navigation devices, and the like. The embodiments of the present invention can be also applicable to the fixed types of terminals such as digital TVs, desk top computers, or the like.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

Further, the mobile terminal 100 may be implemented in a variety of different configurations. Examples of such configurations include a folder-type, slide-type, bar-type, rotational-type, swing-type and combinations thereof.

Thus, as described above, the handler 400 is displayed on a menu screen image to facilitate movement and changing of menus. In addition, because the menus in the hierarchical structure are arranged in a planar structure, the inter-menu movement and selection are facilitated.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
a display unit; and
a controller configured to:
display on the display unit a portion of a menu structure comprising four menu groups of an equal size and a handler disposed at an intersection of the four menu groups, wherein each of the four menu groups includes at least one icon representing an executable application, and wherein the portion of the menu structure represents at least two of the four menu groups;
move the menu structure presented on the display unit in response to a touch and drag operation performed on the handler, wherein a different portion of the menu structure is displayed on the display unit in accordance with the touch and drag operation; and
display only one of the four menu groups on the display unit upon a release of the handler from the touch and drag operation if the one of the four menu groups occupies the largest area of the display unit than any of remaining ones of the four menu groups upon the release of the handler from the touch and drag operation,
wherein the controller is further configured to activate or deactivate the handler based on a predetermined condition, and when the handler is deactivated, the controller is further configured to traverse through the four menu groups based on a touching input operation performed on the display unit, and
wherein the controller is further configured to replace the one of the four menu groups currently displayed on the display unit with another menu group that is next to the one of the four menu groups based on a direction of the touching input operation if a distance travelled by the touching input operation is greater than a set threshold value.

2. The mobile terminal of claim 1, wherein the menu structure further comprises four additional menu groups and one additional handler disposed at an intersection of the four menu groups.

3. The mobile terminal of claim 2, further comprising:
a toggling mechanism configured to toggle between the handler and the one additional handler so as to activate each handler in a successive manner as the toggling mechanism is manipulated.

4. The mobile terminal of claim 1, wherein the handler is further controlled via a physical key located on the mobile terminal.

5. The mobile terminal of claim 1, wherein the controller is further configured to control the display unit to distinctively display the handler compared to other deactivated handlers.

6. The mobile terminal of claim 1, wherein the controller is further configured to control the display unit to distinctively display the handler when the handler is activated compared to when the handler is deactivated.

7. A method of controlling a mobile terminal, the method comprising:
displaying on a display unit of the mobile terminal a portion of a menu structure comprising four menu groups of an equal size and a handler disposed at an intersection of the four menu groups, wherein each of the four menu groups comprises at least one icon representing an executable application, and wherein the portion of the menu structure represents at least two of the four menu groups;

moving the menu structure presented on the display unit in response to a touch and drag operation performed on the handler, wherein a different portion of the menu structure is displayed on the display unit in accordance with the touch and drag operation;

displaying only one of the four menu groups on the display unit upon a release of the handler from the touch and drag operation if the one of the four menu groups occupies the largest area of the display unit than any of remaining ones of the four menu groups upon the release of the handler from the touch and drag operation;

traversing through the four menu groups based on a touching input operation performed on the display unit when the handler is inactive; and replacing the one of the four menu groups currently displayed on the display unit with another menu group that is next to the one of the four menu groups based on a direction of the touching input operation if a distance travelled by the touching input operation is greater than a set threshold value.

8. The method of claim 7, wherein the menu structure comprises four additional menu groups and one additional handler disposed at an intersection of the four additional menu groups.

9. The method of claim 8, wherein the moving the menu structure is alternatively performed based on a manipulation of a physical key located on the mobile terminal that controls the handler displayed on the terminal to traverse through the four menu groups and the four additional menu groups.

10. The method of claim 8, further comprising:
receiving a toggling signal corresponding to a toggle action being performed between the handler and the one additional handler; and
activating each handler in a successive manner as the toggling action is performed.

11. The method of claim 7, further comprising:
distinctively displaying the handler compared to other deactivated handlers.

* * * * *